(12) United States Patent
Drange

(10) Patent No.: US 10,605,947 B2
(45) Date of Patent: Mar. 31, 2020

(54) MARINE STREAMER CONNECTOR USED AS AN ELECTRODE

(71) Applicant: PGS Geophysical AS, Oslo (NO)

(72) Inventor: Geir Andre Motzfeldt Drange, Borgen (NO)

(73) Assignee: PGS Geophysical AS, Oslo (NO)

( * ) Notice: Subject to any disclaimer, the term of this patent is extended or adjusted under 35 U.S.C. 154(b) by 485 days.

(21) Appl. No.: 14/561,332

(22) Filed: Dec. 5, 2014

(65) Prior Publication Data

US 2015/0369946 A1 Dec. 24, 2015

Related U.S. Application Data

(60) Provisional application No. 62/013,887, filed on Jun. 18, 2014.

(51) Int. Cl.
*G01V 3/17* (2006.01)

(52) U.S. Cl.
CPC ...................... *G01V 3/17* (2013.01)

(58) Field of Classification Search
CPC . G01V 3/00; G01V 3/08; G01V 3/081; G01V 3/083; G01V 3/12; G01V 3/15; G01V 3/165; G01V 3/17; G01V 1/38; G01V 1/3808; G01V 1/201; G01V 2001/204; G01V 2001/202
USPC .................................. 324/347–365
See application file for complete search history.

(56) References Cited

U.S. PATENT DOCUMENTS

| 4,298,840 | A | 11/1981 | Bischoff et al. |
| 6,674,286 | B2 | 1/2004 | Lagmanson |
| 7,446,535 | B1* | 11/2008 | Tenghamn ............ G01V 3/083 324/365 |
| 7,602,191 | B2 | 10/2009 | Davidsson |
| 7,737,698 | B2 | 6/2010 | Tenghamn et al. |
| 7,834,632 | B2 | 11/2010 | Tenghamn et al. |
| 8,035,393 | B2 | 10/2011 | Tenghamn et al. |
| 8,098,542 | B2 | 1/2012 | Hillesund et al. |
| 8,198,899 | B2 | 6/2012 | Lindqvist |
| 8,575,938 | B2 | 11/2013 | Karlsen et al. |
| 8,587,316 | B2 | 11/2013 | Juhasz et al. |
| 8,643,374 | B2 | 2/2014 | Mackay |
| 8,669,766 | B2 | 3/2014 | Lindqvist |
| 8,710,845 | B2 | 4/2014 | Lindqvist et al. |
| 8,736,269 | B2 | 5/2014 | Sudow et al. |
| 8,754,649 | B2 | 6/2014 | Sudow et al. |
| 8,816,690 | B2 | 8/2014 | Sudow et al. |

(Continued)

FOREIGN PATENT DOCUMENTS

CA 2643545 6/2009

*Primary Examiner* — Lee E Rodak

(57) ABSTRACT

Streamer section connector used as an electrode. A first streamer section includes a first outer surface that defines an interior volume, a first connector coupled to a first end of the first outer surface, and a first digitizer node. The digitizer node defines a first input port and second input port, the first digitizer node disposed within the interior volume of the first outer surface, and the first input port is electrically coupled to the first connector such that the portion of the first connector that is electrically conductive is a first electrode. The first digitizer node configured to measure a potential difference between the first electrode at a first potential and a second potential coupled to the second input port.

27 Claims, 6 Drawing Sheets

(56) References Cited

U.S. PATENT DOCUMENTS

| | | | |
|---|---|---|---|
| 2006/0238200 A1* | 10/2006 | Johnstad | G01V 1/201 |
| | | | 324/337 |
| 2009/0001987 A1* | 1/2009 | Davidsson | G01V 3/12 |
| | | | 324/347 |
| 2009/0058422 A1 | 3/2009 | Tenghamn et al. | |
| 2009/0295394 A1* | 12/2009 | Babour | G01V 3/083 |
| | | | 324/350 |
| 2010/0001733 A1 | 1/2010 | Combee | |
| 2011/0255368 A1 | 10/2011 | Sudow et al. | |
| 2011/0260730 A1* | 10/2011 | Sudow | G01V 3/083 |
| | | | 324/365 |
| 2011/0292759 A1 | 12/2011 | Sudow et al. | |
| 2012/0081995 A1 | 4/2012 | Hillesund et al. | |
| 2012/0242343 A1 | 9/2012 | Lindqvist | |
| 2012/0314535 A1 | 12/2012 | Martinez | |
| 2013/0119996 A1* | 5/2013 | Mackay | G01V 3/083 |
| | | | 324/347 |
| 2013/0127471 A1* | 5/2013 | Sudow | G01V 1/201 |
| | | | 324/347 |
| 2013/0187655 A1 | 7/2013 | Juhasz et al. | |
| 2013/0241559 A1 | 9/2013 | Lindqvist et al. | |
| 2013/0300420 A1 | 11/2013 | Juhasz et al. | |

\* cited by examiner

MARINE STREAMER CONNECTOR USED AS AN ELECTRODE

CROSS-REFERENCE TO RELATED APPLICATIONS

This application claims the benefit of U.S. Provisional Application Ser. No. 62/013,887 filed Jun. 18, 2014 and titled "Marine Streamer Connectors Used as Electrodes". The provisional application is incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., oceans, large lakes). Marine geophysical surveying systems frequently use a plurality of streamers (long cables), which contain one or more sensors to detect energy emitted by one or more sources and subjected to interaction with underground formations below the water bottom. Electromagnetic streamers may include sensors for sensing electromagnetic fields generated by a source and interacting with hydrocarbon deposits, for example a subterranean deposit beneath the sea bed. Seismic streamers may include sensors for detecting seismic signals reflected from the subterranean formations including the hydrocarbon deposit.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible load carrying member that also comprises electrical conductors and/or optical conductors for carrying electrical power and/or signals between components.

"Rope" shall mean a flexible load carrying member that does not include electrical and/or optical conductors. Such a rope may be made from fiber, steel, other high strength material, chain, or combinations of such materials.

"Line" shall mean either a rope or a cable.

"Digitizer node" shall mean electrical circuitry that generates a digital data value representation of an analog value.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

The example systems are directed to streamers for marine geophysical surveys that have an electromagnetic component, with or without a seismic component. More particularly, streamers of the example systems are assembled from individual streamer sections coupled together end-to-end by way of connectors. Some or all of the connectors of the streamer sections are used as electrodes for sensing electromagnetic fields in the vicinity the streamer. The specification first turns to an overview of an example marine geophysical survey system.

Figure 1:
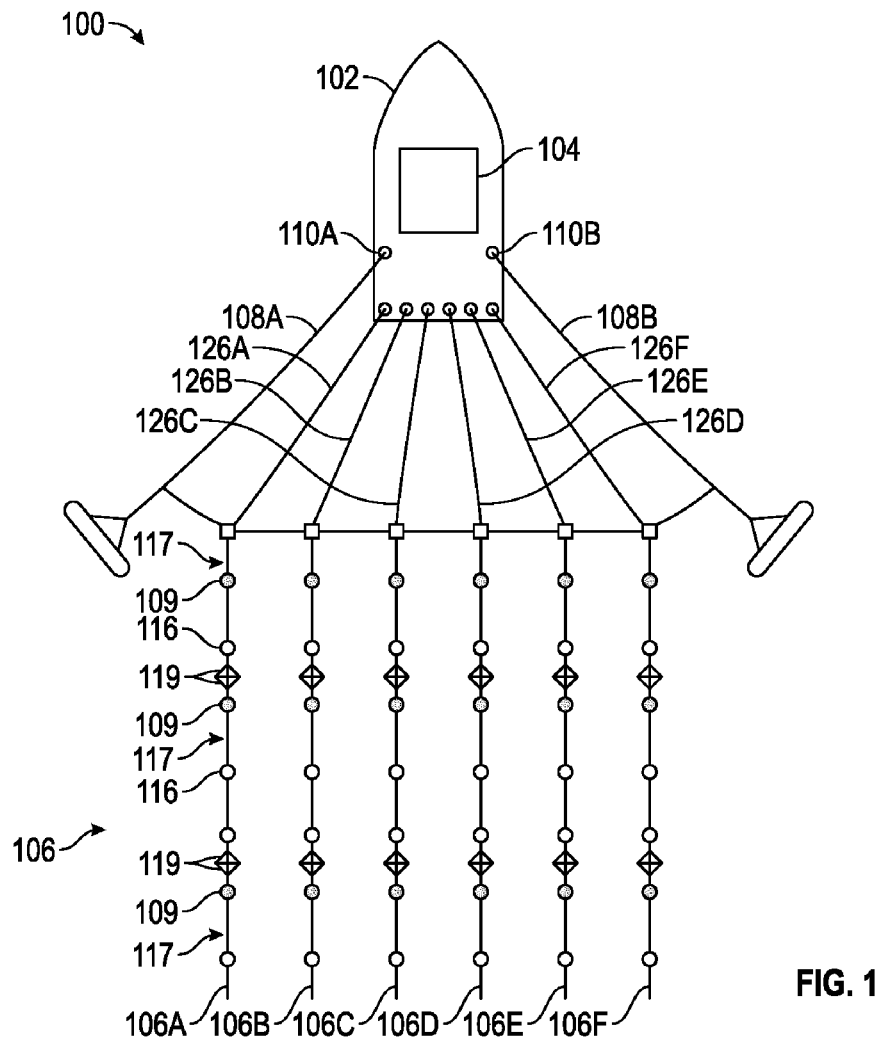
FIG. 1 shows an overhead view of a marine geophysical survey system in accordance with at least some embodiments.

FIG. 1 shows an overhead view of a marine geophysical survey system 100 in accordance with at least some embodiments. In particular, FIG. 1 shows a survey vessel 102 having onboard equipment, herein referred to collectively as recording system 104, such as navigation, energy source control, and data recording and processing equipment. Survey vessel 102 is configured to tow one or more streamers 106A-F through a water body. While FIG. 1 illustratively shows six streamers 106, any number of streamers 106 may be used.

The streamers 106 are coupled to towing equipment that helps maintain the streamers 106 at selected depth and lateral positions with respect to each other and with respect to the survey vessel 102. The towing equipment may comprise two paravane tow lines 108A and 108B each coupled to the survey vessel 102 by way of winches 110A and 110B, respectively.

Electrical and/or optical connections between appropriate components in the recording system 104, and components on the streamers 106 (such as sensors 116) may be made using inner lead-in cables 126A-F. In other embodiments (not shown in FIG. 1) one or more streamers 106 may be deployed on the sea floor as all or part of an ocean bottom cable. Streamers 106 included within an ocean bottom cable may comprise one or more streamer sections as described below. A geophysical survey may include either towed streamers as in the example shown in FIG. 1, ocean bottom cable, or both. Thus, reference to "streamers" shall not require that the streamers be towed through the water.

In a seismic survey, sensors 116 may include one or more instruments such as hydrophones, geophones, or accelerometers to detect seismic signals. In an electromagnetic survey, sensors 116 may include an electric field detector, a magnetic field detector, or a combination electric field and magnetic field detector. In some embodiments, electromagnetic sensors 116 may comprise electrodes in contact with the water body. In a survey, streamers 106 may include seismic streamers, electromagnetic streamers, and streamers which include seismic sensors and electromagnetic sensors.

A streamer may be made of multiple streamer sections 117 coupled together using connectors 119 disposed at each end of streamer sections 117 that are conjoined with an another streamer section 117. Connectors 119 may include one or more electrical and/or optical pins (not shown in FIG. 1) for relaying power and/or communications signals throughout the streamer. A streamer section may, in at least some embodiments, be in the range of one meter to 300 meters or more, and in some cases in the range of 75 meters to 150 meters. Sensors 116 may be interconnected via a communication pathway to recording system 104 along a length of a streamer 106, which may, in some embodiments reach lengths of tens of kilometers. The sensors 116 may be coupled to digitizer nodes 109 which may be used to digitize analog signals from the sensors. Digitizer nodes 109 may include an analog-to-digital convertor, for example. A streamer section 117 may be an electromagnetic-only streamer section comprised of sensors that are electromagnetic sensors, a seismic-only streamer section comprised of only seismic sensors, or a combined seismic-electromagnetic streamer section comprised of both electromagnetic sensors and seismic sensors.

Figure 1A:
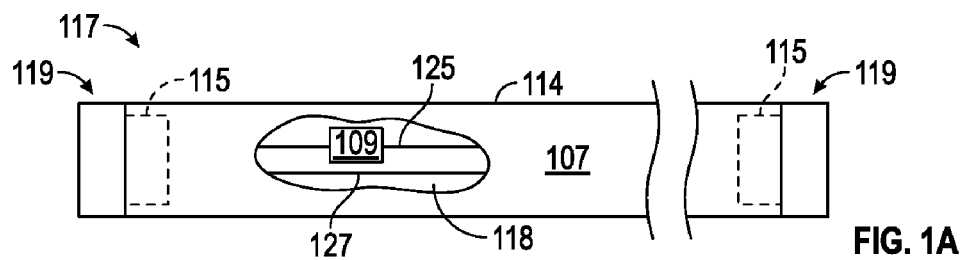
FIG. 1A shows, in a partial cutaway view, an elevation of a streamer section in accordance with at least some embodiments.

FIG. 1A shows a side elevation view, with partial cutaway, of an example streamer section 117. In particular, the streamer section 117 has an outer surface 107 that defines an interior volume 118, connectors 119 on opposite ends of the outer surface 107, as well as internal components. In certain embodiments, the connectors 119 of a streamer section 117 are electrically isolated from each other. The outer surface 107 may be defined by an outer jacket 114 of flexible material, such as polyurethane. In other example systems the outer surface 107 may be defined by netting or wire braids, possibly disposed over other material, such as solidified gels or solid foam. As shown in the partial cutaway of the outer jacket 114, a digitizer node 109 may be disposed within the interior volume, and a wire bundle 125 and a rope 127 may also be disposed within the interior volume 118. Rope 127 may be provided as a strength member, and in at least some embodiments may be comprised of KEVLAR brand products. In at least some embodiments, wire bundle 125 may include power and communications conductors; such conductors may further include electrical conductors and fiber optics conductors, which electrical and fiber optic conductors may support communication channels, such as electrical communication channels and optical communication channels, respectively.

The connectors 119 may couple to the outer jacket 114 in any suitable fashion. As illustrated, the outer jacket 114 telescopes over a reduced diameter portion 115 of each connector (the reduced diameter portion shown in dashed lines). In some example systems, clamps (not specifically shown) may be connected over the outer surface 107 at the locations of the reduced diameter portions 115 to hold the outer jacket 114 and connectors in operational relationship. The connectors 119 may be designed and constructed to mechanically couple to adjacent streamer sections (not shown in FIG. 1A) or to terminate the streamer. In example systems, connectors 119 (or at least a portion of the connectors) are constructed of electrically-conductive materials, such as metallic materials.

Returning to FIG. 1, a sensor 116 in the form of an electromagnetic sensor may include an electrode for electrically communicating with a water body through which the electromagnetic signals travel, as described further below in conjunction with FIG. 2. In at least some embodiments of an electromagnetic streamer or a combined seismic-electromagnetic streamer, the connectors 119 (or the electrically-conductive portions thereof) may be electrodes for receiving electromagnetic survey signals, as described further in conjunction with FIG. 3. Digitizer nodes 109 may be used to measure and digitize the received electromagnetic signals.

Figure 2:
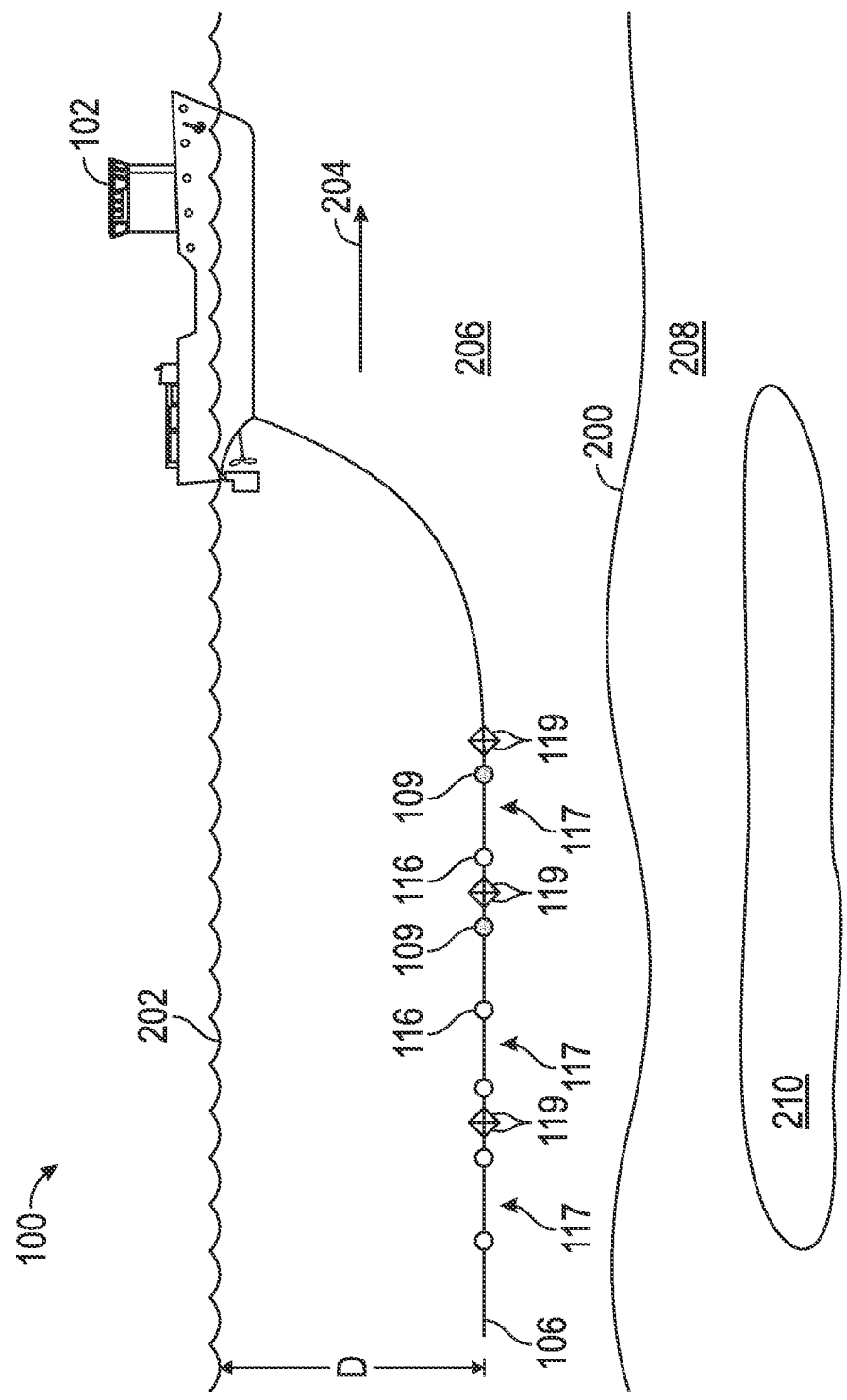
FIG. 2 shows a side elevation view of a marine geophysical survey in accordance with at least some embodiments.

Refer now to FIG. 2 showing a side view of the marine geophysical survey system 100 in order to convey further concepts. In particular, FIG. 2 shows the survey vessel 102 towing streamer 106 along a path of travel 204 within water body 206, which may be sea water. In FIG. 2, for ease of illustration, only a single streamer 106 is shown. However as described in conjunction with FIG. 1, a marine geophysical survey system 100 may include any number of streamers. Streamer 106 may be towed above the sea bed 200 at a depth, D, beneath the surface 202 of water body 206. In this way, electrodes of a streamer section 117 are immersed in the water body 206 and in electrical contact with the water body 206.

Electromagnetic fields from a source (not shown in FIG. 2) travel through water body 206 to sea bed 200 and into subterranean formation 208 beneath sea bed 200. Subterranean formation 208 reacts back on the electromagnetic field in accordance with the electrical properties of the formation. In particular, the electrical resistivity of a hydrocarbon reservoir 210 may be higher (i.e. electrical conductivity lower) than a permeable aqueous saline-bearing volume of subterranean formation 208. The resulting electromagnetic signal from the interaction of the electromagnetic fields with a hydrocarbon reservoir 210 may be coupled via the electrodes of sensors 116 to electrical circuitry for measuring the electromagnetic signal in the vicinity of a streamer section 117.

Figure 3:
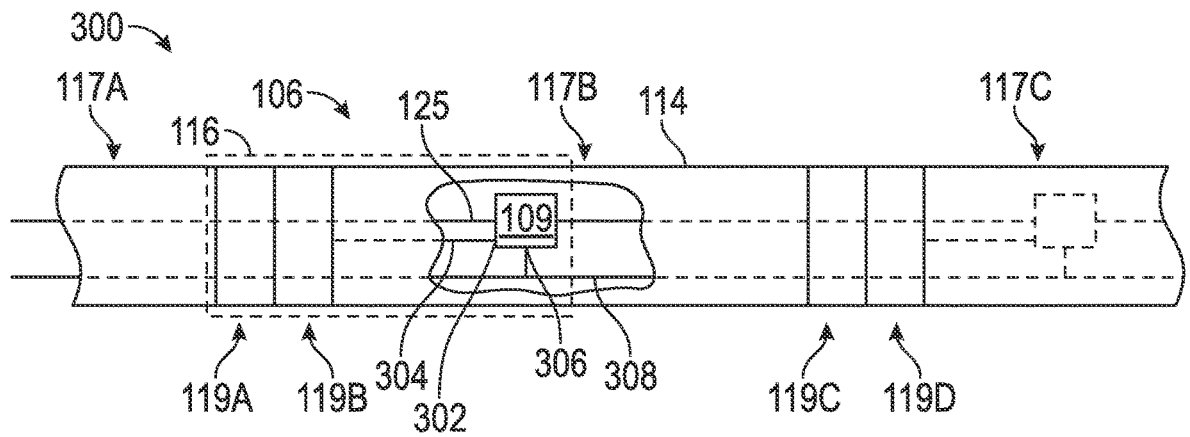
FIG. 3 shows, in a partial cutaway view, a portion of a streamer in accordance with at least some embodiments.

FIG. 3 shows a side elevation view of a portion 300 of a streamer 106, including a partial cutaway view. In particular, portion 300 may include a streamer section 117A connected to one end of streamer section 117B and a streamer section 117C connected to a second end of streamer section 117B. Streamer sections 117A and 117B are coupled by connectors 119A and 119B of streamer sections 117A and 117B, respectively. Similarly, streamer sections 117B and 117C are coupled by connectors 119C and 119D of streamer sections 117B and 117C, respectively.

One or more of the connectors 119 may be made of an electrically conducting material. For example, one or more connectors 119 (or at least portions of such connector) may be stainless steel, titanium, aluminum, nickel or other metal, and alloys thereof. When portion 300 of the streamer is deployed in a marine geophysical survey, electrically conducting connectors 119 may act as electrodes in electrical contact with the water body 206. When connectors 119 are coupled together, the two connectors may form a contiguous electrically conducting member. Further, an outer surface of the connectors 119 may have a surface treatment to enhance the electrical conductivity to the water body 206.

In an alternative embodiment, one connector of a set of joined connectors may be an electrically insulating material. For example, connector 119A may be made of an electrically insulating material, and connector 119B may be made of an electrically-conductive material. In such an embodiment, when connectors 119A and 119B are mated, the electrically conducting portion being connector 119B may then form the electrode.

Still referring to FIG. 3, as shown in the partial cut-away view a digitizer node 109 may reside within the interior volume 118. The example digitizer node 109 defines a first input port 302 and a second input port 306. In the example systems, the first input port 302 is coupled by a wire 304 to the connector 119B, and thus the connector 119B is a first electrode associated with the digitizer node 109. If connector 119A and 119B are both electrically-conductive and are electrically coupled together (as part of being mechanically coupled together), the combination of connectors 119A and 119B are the first electrode associated with the digitizer node 109. Further, a wire 308 may be disposed along a length of a streamer 106 and may be connected to a second input port 306 of digitizer node 109. Thus, digitizer node 109 may measure a potential difference between the first electrode at a first potential and a second potential carried on the wire 308 and coupled to the input port 306. In this way, electric field measurements can be made without the use of a feed-through connector (or the like) through outer jacket 114.

In the example system of FIG. 3 discussed to this point, wire 308 acts as a reference potential for digitizer node 109. Other configurations for providing the second potential will be described below. In any case, the sensing of the electromagnetic survey signal is effected by the difference in electrical potentials, and whether a potential (or an electrode at a potential) is denominated as a reference potential, or otherwise, is a matter of convention. Thus, interchanging the potentials coupled to input ports 302 and 306 of digitizer node 109 reverses the polarity of the output signal but the magnitude of the output signal is unchanged. Insofar as the electromagnetic survey signal may be an alternating current (AC) signal, such a polarity reversal, at most, reflects a 180° phase shift relative to the electromagnetic survey signal. However, in at least some embodiments of a streamer 106 having multiple streamer sections 117, a reference potential may particularly refer to a potential that is common with respect to a plurality of the streamer sections.

In at least some embodiments, wire 308 may be wire segment within each streamer section 117 electrically connected through connectors 119 to be an equipotential reference conductor spanning a plurality of streamer sections 117. In at least some other embodiments, wire 308 may be a wire spanning a full length of the streamer. Further, wire 308 may only be electrically connected to an input port of one or more digitizer nodes and to no other electrical connection. Stated differently, in at least some embodiments wire 308 may electrically float. In yet other embodiments, wire 308 may be electrically coupled to the water body at the distal end (i.e. the end furthest from the source) of streamer 106. In other words, in at least some embodiments, wire 308 may have a single point of electrical contact with the water body.

As illustrated in FIG. 3, digitizer node 109 may measure and digitize the potential difference between first electrode in the form of connector 119B with respect to wire 308. The potential difference may be indicative of the electromagnetic field in the water body at the position of the streamer section 117B. Thus, in at least some embodiments, the sensor 116 comprises the electrode formed by the connector 119, digitizer node 109, and wire 308.

Figure 3A:
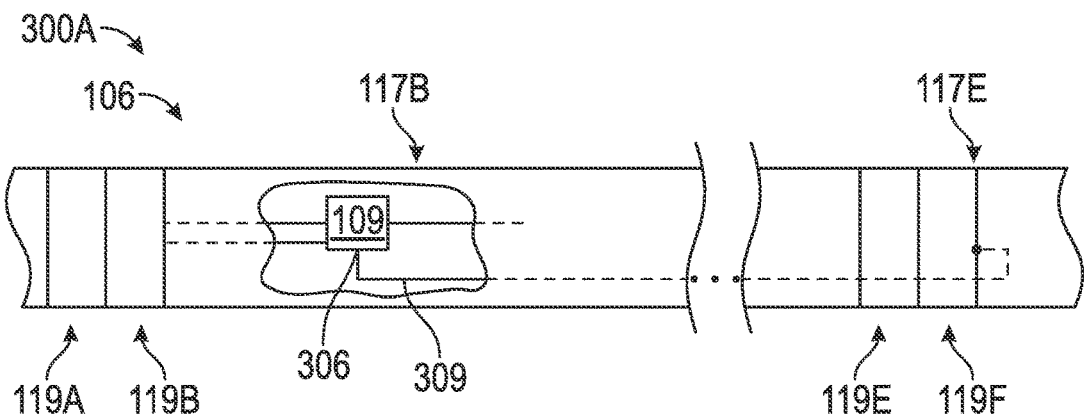
FIG. 3A shows, in a partial cutaway view, a portion of a streamer in accordance with at least some embodiments.

Alternatively, as shown in FIG. 3A illustrating in a partial cutaway view, a portion 300A of a streamer 106 in accordance with at least some embodiments, a second potential which may be the reference potential, may be provided by a second electrode being connectors 119E, F in a streamer section 117E. Connectors 119E, F may be spaced apart from connectors 119A, B and electrically connected to input port 306 of digitizer node 109 via wire 309. In still another alternative embodiment, connector 119E may be made of an electrically insulating material, in which case connector 119F of conjoined connectors 119E, F forms the second electrode for digitizer node 109. As shown in FIG. 3A, the second electrode may be one more streamers sections away from the location digitizer node 109.

Figure 3B:
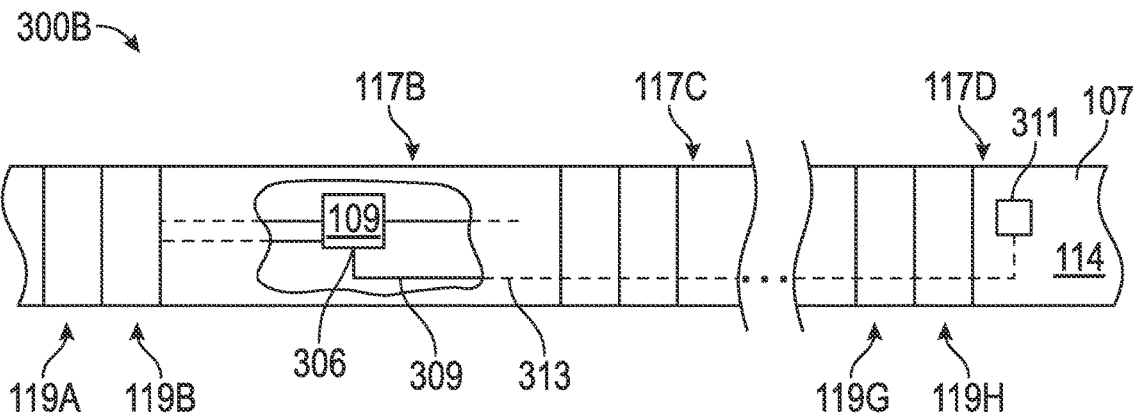
FIG. 3B shows, in a partial cutaway view, a portion of a streamer in accordance with at least some embodiments.

Yet another embodiment of a portion of a streamer, portion 300B is shown in FIG. 3B. Streamer section 117D includes an electrode 311 disposed on an outer surface 107 of the streamer section 117D. As previously described, outer surface 107 may be defined by an outer jacket 114. In at least some embodiments, electrode 311 may be disposed within a cavity in streamer section 117D or within a conductive-gel-filled pocket in streamer section 117D. Electrode 311 may be electrically coupled to input port 306 of digitizer node 109 via wire 313. Wire 313 may be electrically coupled to electrode 311 by an electrical feed-through bulkhead connector (not shown in FIG. 3B) passing through the outer jacket 114. Electrode 311 may provide the second electrical potential as described above. Thus, in at least some embodiments of portion 300B, one or both of connectors 119G and 119H may be electrical insulators. As shown in FIG. 3B, the electrode 311 may be one more streamers sections away from the location digitizer node 109.

Returning again to FIG. 3, digitizer node 109 may be provided power and communication links via wire bundle 125. For example, digitizer node 109 may include telemetry circuitry coupled to a telemetry channel within wire bundle 125. The digitized voltage data may then be communicated to onboard recording system 104 on survey vessel 102.

As described above, a streamer 106 may include multiple streamer sections 117 coupled together. Thus, a streamer 106 may include streamer sections 117 disposed along a length of streamer 106 in which the various embodiments thereof may be incorporated at varying positions within the streamer 106. In this way, electrodes having different spacing therebetween may be used to provide input potentials to digitizer nodes 109. Moreover, electromagnetic survey signals having different electric field strengths in the vicinity of the sensors 116 may be accommodated, as described in commonly-owned U.S. Pat. No. 8,710,845 which is hereby incorporated by reference as if fully set forth herein. A mechanism for connecting electrodes disposed in a plurality of streamer sections and having different spacing therebetween is also described therein.

Figure 4A:
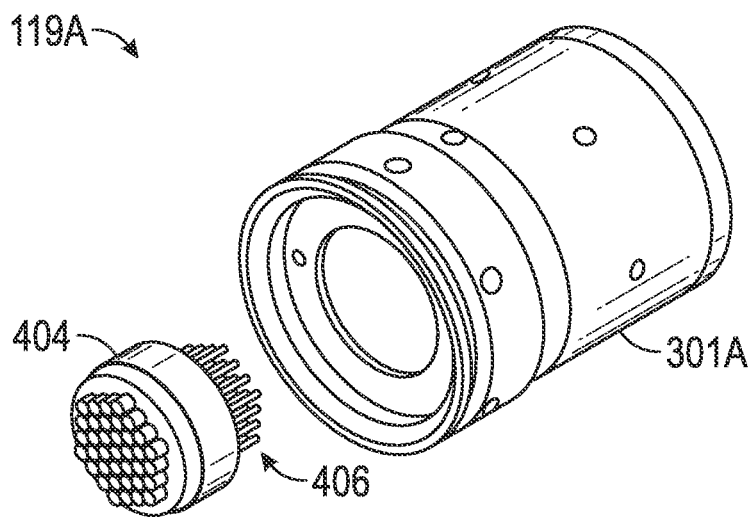
FIG. 4A shows a perspective view of a portion of a connector in accordance with at least some embodiments.
Figure 4B:
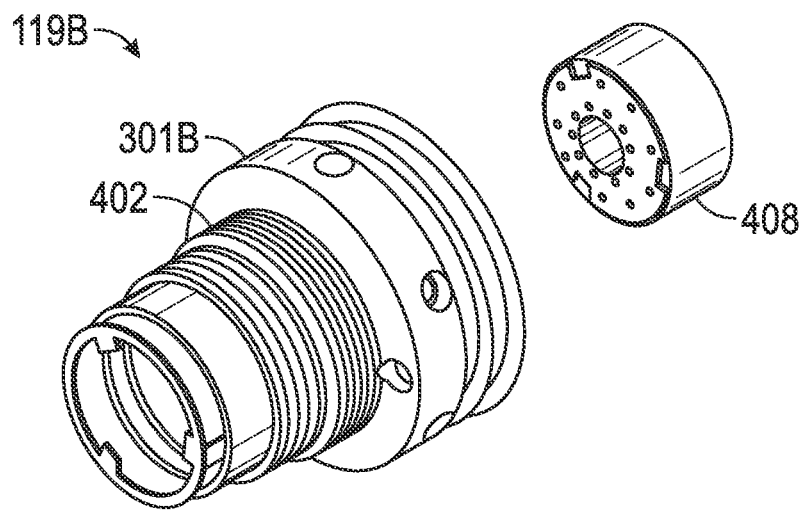
FIG. 4B shows a perspective view of a portion of a connector in accordance with at least some embodiments.

To further appreciate the foregoing principles, refer to FIGS. 4A and 4B showing in perspective view, example connectors 119A and 119B. Connectors 119A and 119B may securely couple, both electrically and mechanically. For example, connectors 119A and 119B may securely couple via mating threaded surfaces. In FIG. 4B is depicted housing 301B having a thread portion 402. A mating thread member may be disposed on an interior surface (not visible in FIG. 4A) of housing 301A. When coupled together, housings 301A and 301B may thus form a contiguous conducting electrode. Connector 119A may include a pin insert 404 comprising one or more pins 406. Connector 119B may include a receptacle insert 408 disposed to mate with pin insert 404 when connectors 119A, B are conjoined.

Figure 5:
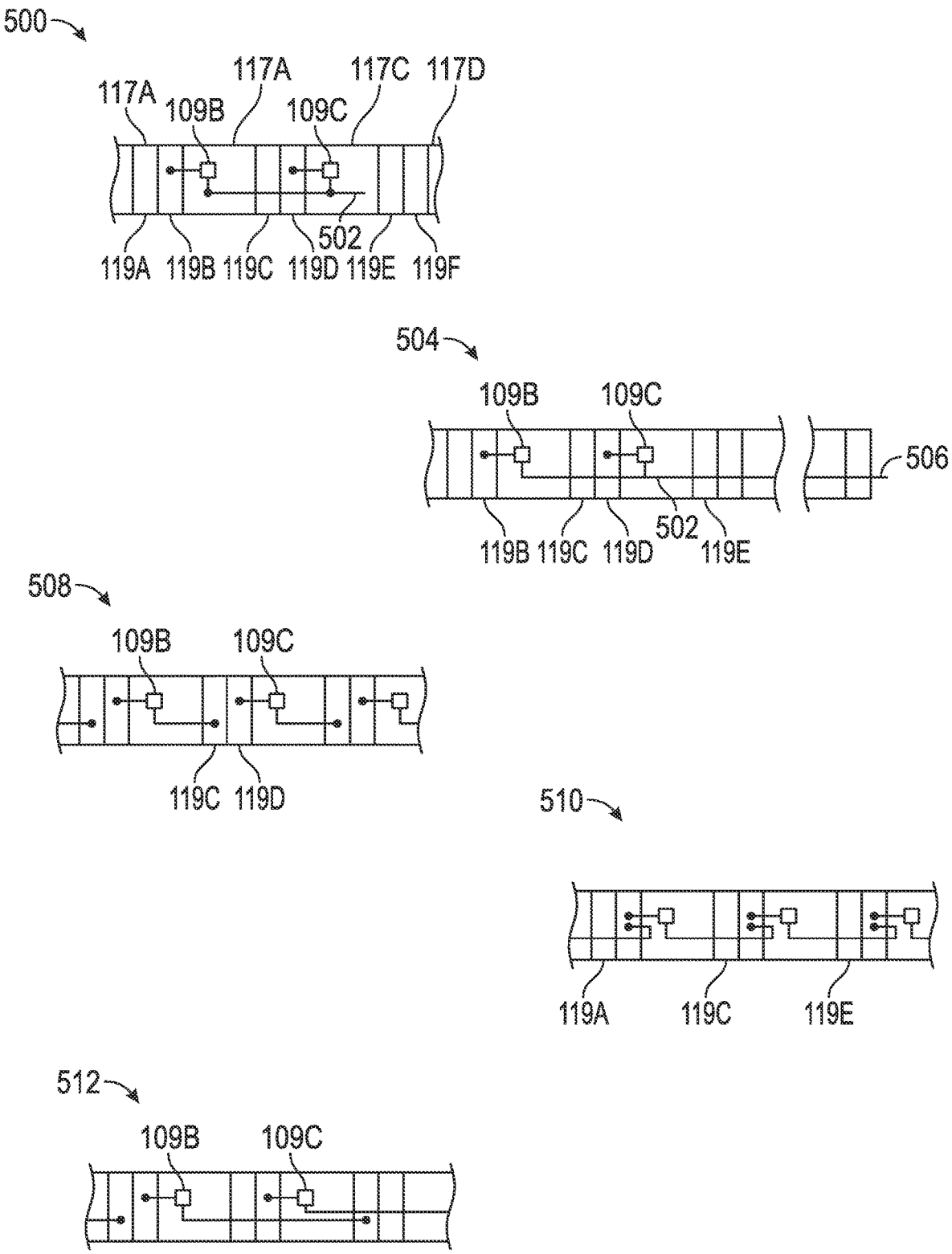
FIG. 5 shows, in a shorthand notation, various possible implementations in accordance with various embodiments.

Now understanding the concepts related to a streamer section 117 in accordance with example systems, such as connectors 119, a digitizer node 109, input ports 302 and 306, and various examples of wires connecting the input ports to various components, the specification now defines a shorthand notation to more clearly convey various configurations possible. In particular, FIG. 5 shows a configuration 500 similar to the system of FIG. 3. Visible in FIG. 5 is a portion of streamer sections 117A having a connector 119A coupled to streamer section 117B by connector 119B. Streamer section 117B has connector 119C coupled to streamer section 117C by connector 119D. Finally, streamer section 117C has connector 119E coupled to streamer section 117D by connector 119F. Further visible are the digitizer nodes 109B and 109C. One input port of digitizer node 109B is electrically coupled to the connector 119B, and one input port of digitizer node 109C is electrically coupled to the connector 119D. The second input ports of the digitizer nodes are coupled to a wire 502 that is electrically coupled directly the surrounding water body. Thus, configuration 500 illustrates streamer sections each measuring voltage on a connector relative a reference voltage that is electrically floated.

Configuration 504 is similar to configuration 500, but in configuration 504 the wire 502 extends beyond the last streamer section and effectively becomes an electrode 506 at the aft (farthest from the source) end of the streamer. Thus, configuration 504 illustrates streamer sections each measuring voltage on a connector relative a reference voltage that is the voltage on an electrode at the end of the streamer.

In configuration 508 the input ports of a digitizer node couple to connectors of the streamer section within which the digitizer node resides. Thus, configuration 508 illustrates streamer sections where the voltage across each streamer section can be measured. Moreover, because the adjacent streamer sections effective share an electrode between them (in the form of electrically coupled connectors (e.g., 119C and 119D)) it is possible to mathematically determine voltage across any arbitrary length along the streamer. A similar result is achieved with the configuration 510, but configuration 510 contemplates that at least one connector may be non-electrically-conductive (in the example, connectors 119A, 119C, and 119E are non-electrically-conductive).

Configuration 512 is similar to configuration 508, but illustrates that the downstream connector to which a digitizer node couples need not be on the same streamer section. While configuration 512 shows each digitizer node connecting to the downstream connector of an adjacent streamer section, the connection may be on the downstream connector one or more streamers sections away.

Figure 6:
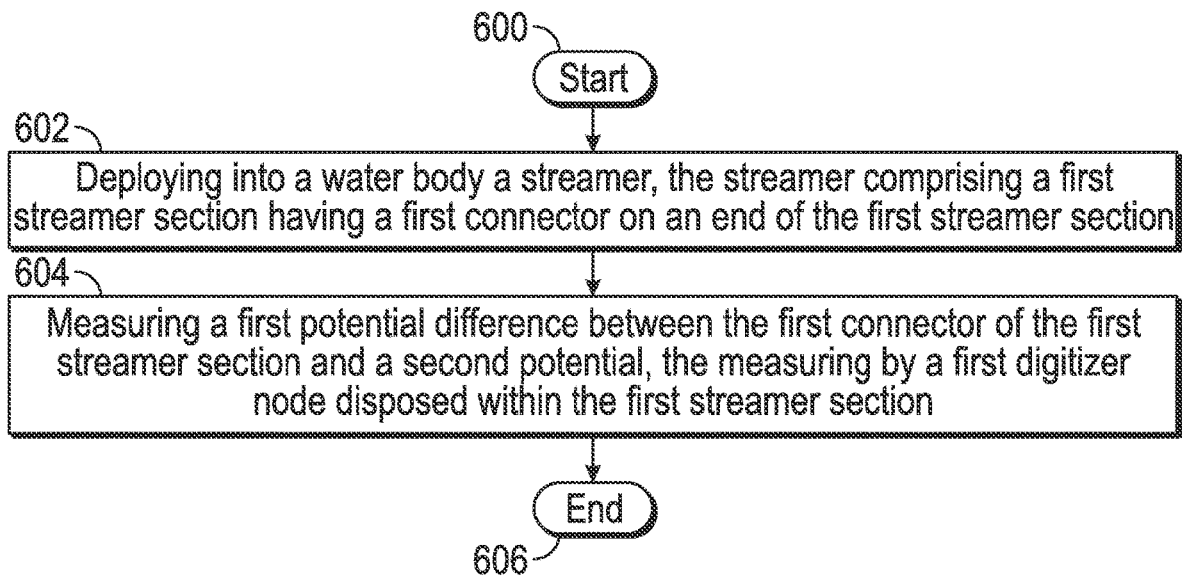
FIG. 6 shows a flowchart of a method in accordance with at least some embodiments.

FIG. 6 shows a method in accordance with at least some embodiments. In particular, the method starts (block 600) and proceeds to: deploying into a water body a streamer, the streamer comprising a first streamer section having a first connector and a second connector with the connectors on ends of the first streamer section, and the streamer comprising a second streamer section having a third connector and a fourth connector with the connectors on opposite ends of the second streamer section (block 602); and measuring a first potential difference between the first connector of the first streamer section and a reference potential, the measuring by a first digitizer node disposed within the first steamer section (block 604). In some cases the measuring is completed while towing. Thereafter the methods ends (block 606).

In accordance with an embodiment, a geophysical data product may be produced. The geophysical data product may include electromagnetic or electromagnetic and seismic survey data processed from data received from a streamer including a plurality of streamer sections coupled by connectors at ends of the streamer sections. The connectors may form electrodes coupled to digitizer nodes for measuring potential differences indicative of electromagnetic fields interacting with a subterranean formation. The geophysical data product may be stored on a non-transitory, tangible, computer-readable medium. The geophysical data product may be produced offshore (i.e. by equipment on a survey vessel) or onshore (i.e. at a facility on land) either within the United States or another country. If the geophysical data product is produced offshore or in another country, it may be imported onshore to a facility in the United States. Once onshore, in the United States, geophysical analysis may be performed on the geophysical data product.

Figure 7:
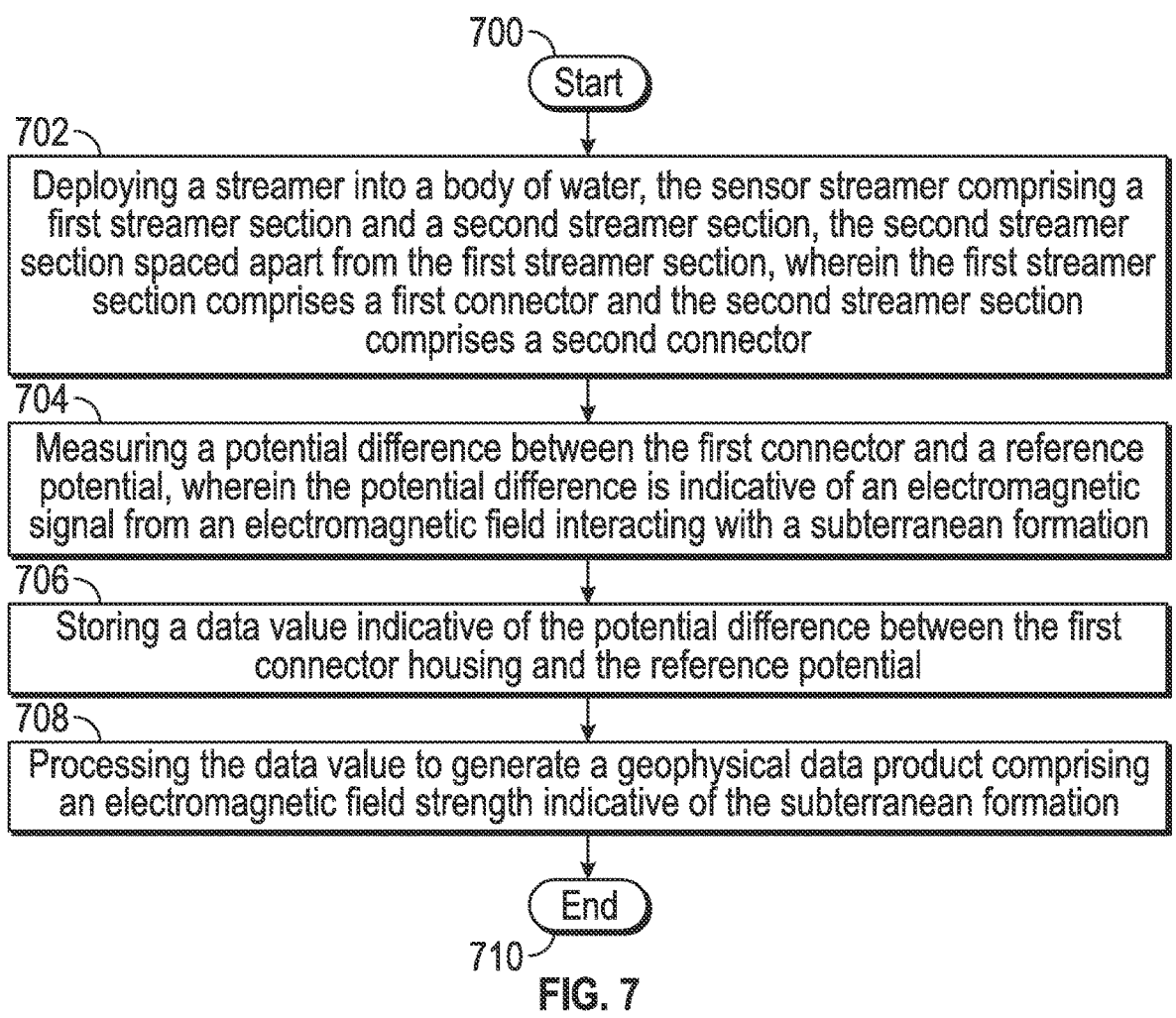
FIG. 7 shows a flowchart of a method in accordance with at least some embodiments.

FIG. 7 shows method in accordance with example embodiments. In particular, the method starts (block 700) and comprises: deploying a streamer into a water body, the streamer comprising a first streamer section and a second streamer section, the second streamer section spaced-apart from the first streamer section, wherein the first streamer section comprises a first connector and the second streamer section comprises a second connector (block 702); measuring a potential difference between the first connector and a reference potential, wherein the potential difference is indicative of an electromagnetic signal from an electromagnetic field interacting with a subterranean formation (block 704); storing a data value indicative of the potential difference between the first connector and the reference potential (block 706); and processing the data value to generate a geophysical data product comprising an electromagnetic field strength indicative of the subterranean formation (block 708). Thereafter the method ends (block 710).

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, each streamer section 117 may include telemetry units that comprise circuitry separate from the digitizer nodes, or the digitizer nodes may communicate directly with the recording equipment in a survey vessel over a local area network (LAN). It is intended that the following claims be interpreted to embrace all such variations and modifications.

What is claimed is:

1. An apparatus comprising:
    a first streamer section comprising:
        a first outer jacket of flexible material, the first outer jacket defines an outer surface and an interior volume;
        a first connector coupled to a first end of the first outer jacket and configured to directly connect to a mating connector of another streamer section, the first connector defining a first threaded surface, and at least a portion of the first connector is electrically conductive for electrical contact with a water body;

a second connector coupled to a second end of the first outer jacket, the second connector defining a second threaded surface, and the second end opposite the first end;

a first digitizer node that defines a first input port and second input port, the first digitizer node disposed within the interior volume of the first outer jacket, the first input port is electrically coupled to the first connector such that the portion of the first connector that is electrically-conductive is a first electrode; and the first digitizer node configured to measure a potential difference between the first electrode at a first potential and a second potential coupled to the second input port.

2. The apparatus of claim 1 further comprising a wire disposed within the interior volume of the first outer jacket, the wire coupled to the second input port of the first digitizer node, and the wire comprises the second potential.

3. The apparatus of claim 2 wherein the wire is at least one selected from the group consisting of: electrically floated; coupled to a second electrode spaced apart from the first streamer section; and coupled to an electrode at an aft end of a streamer of which the first streamer section is a member.

4. The apparatus of claim 1 further comprising:
a second streamer section comprising:
a second outer jacket of flexible material, the second outer jacket defines an interior volume, and the second outer jacket distinct from the first outer jacket; and
a third connector coupled to a first end of the second outer jacket, the third connector defining a third threaded surface mechanically coupled directly to the second threaded surface of the second connector, and at least a portion of the third connector is electrically-conductive;
a fourth connector coupled to a second end of the second outer jacket, the second end of the second outer jacket opposite the first end of the second outer jacket;
a second digitizer node that defines a third input port and fourth input port, the second digitizer node disposed within the interior volume of the second outer jacket, the third input port electrically coupled to the third connector such that the portion of the third connector that is electrically conductive is a second electrode; and
the second digitizer node configured to measure a potential difference between the second electrode at a third potential and the second potential coupled to the fourth input port.

5. The apparatus of claim 4 further comprising:
a first wire disposed within the interior volume of the first outer jacket, the first wire coupled to the second input port of the first digitizer node, and the first wire comprises the second potential;
a second wire disposed within the interior volume of the second outer jacket, the second wire coupled to the fourth input port of the second digitizer node, the second wire coupled to the first wire at the third connector; and
the first and second wires comprise the second potential.

6. The apparatus of claim 5 wherein each of the first and second wires are at least one selected from the group consisting of: electrically floated; and coupled to an electrode at an aft end of a streamer of which the first and second streamer sections are members.

7. The apparatus of claim 1 further comprising:
a second streamer section comprising:
a second outer jacket of flexible material, the second outer jacket defines an interior volume, and the second outer jacket distinct from the first outer jacket; and
a third connector coupled to a first end of the second outer jacket, the third connector defining a third threaded surface mechanically coupled to the second threaded surface of the second connector, and at least a portion of the third connector is electrically conductive;
the second input port of the first digitizer node electrically coupled to the second connector such that an electrically conducting portion of the second connector and the electrically conducting portion of the third connector is a second electrode; and
the first digitizer node configured to measure a potential difference between the first electrode at the first potential and the second electrode at the second potential.

8. The apparatus of claim 1 wherein the first streamer section further comprises:
at least a portion of the second connector is electrically conductive;
the second input port electrically coupled to the second connector such that the portion of the second connector that is electrically conductive is a second electrode; and
the first digitizer node configured to measure a potential difference between the first electrode at the first potential and the second electrode at the second potential.

9. The apparatus of claim 8 further comprising:
a second streamer section comprising:
a second outer jacket of flexible material, the second outer jacket defines an interior volume; and
a third connector coupled to a first end of the second outer jacket, the third connector defining a third threaded surface mechanically coupled to the second threaded surface of the second connector, and at least a portion of the third connector is electrically-conductive;
a fourth connector coupled to a second end of the second outer jacket opposite the third connector, at least a portion of the fourth connector is electrically-conductive;
a second digitizer node that defines a third input port and fourth input port, the second digitizer node disposed within the interior volume of the second outer jacket, the third input port is electrically coupled to the third connector such that the portion of the third connector that is electrically-conductive is a third electrode, and the fourth input port is electrically coupled to the fourth connector such that the portion of the fourth connector that is electrically-conductive is a fourth electrode; and
the second digitizer node configured to measure a potential difference between the third electrode and the fourth electrode.

10. The apparatus of claim 9 wherein the second electrode and the third electrode are electrically coupled.

11. The apparatus of claim 1 further comprising:
a second streamer section mechanically coupled to the first streamer section, the second streamer section defines a second outer jacket with a second electrode exposed on the second outer jacket;

the second input port of the first digitizer node electrically coupled to the second electrode; and the first digitizer node configured to measure a potential difference between the first electrode at the first potential and the second electrode at the second potential.

12. The apparatus of claim 1 further comprising a communication channel coupled to the first digitizer node, the communication channel configured to communicate a data value created by the first digitizer node, the data value indicative of the potential difference between the first electrode and the second potential.

13. The apparatus of claim 12 wherein the communication channel is at least one selected from the group consisting of: an optical communication channel; and an electrical communication channel.

14. A method comprising:
creating a streamer by coupling a first connector of a first streamer section directly to a mating connector of another streamer section, the first connector having at least a portion that is metallic and configured to be in electrical contact with a water body, the first connector on a first end of a first outer jacket of the first streamer section, and the first streamer section having a second connector on a second end of the first outer jacket opposite the first end;
deploying the streamer into the water body;
measuring a first potential difference between the first connector of the first streamer section and a second potential, the measuring by a first digitizer node disposed within the first steamer section.

15. The method of claim 14 wherein the second potential comprises a reference potential.

16. The method of claim 15 further comprising digitizing the first potential difference between the first connector and the reference potential, the digitizing creates a data value indicative of the potential difference.

17. The method of claim 16 further comprising communicating the data value to a storage system via a telemetry channel.

18. The method of claim 17 wherein the telemetry channel is at least one selected from the group consisting of:
an optical telemetry channel; and
an electrical telemetry channel.

19. The method of claim 14 wherein measuring further comprises measuring while towing the streamer through the water body.

20. The method of claim 14, wherein measuring further comprises measuring the first potential difference between the first connector the second potential at the second connector.

21. The method of claim 20,
wherein creating the streamer further comprises coupling a third connector of a second streamer section directly to the second connector, the third connector on a first end of a second outer jacket of the second streamer section, and the second streamer section having a fourth connector on a second end of the second outer jacket; and further comprising
measuring a third potential between the third connector and the fourth connector, the measuring by a second digitizer node disposed within the second steamer section.

22. The method of claim 15,
wherein creating the streamer further comprises coupling a third connector of a second streamer section directly to the second connector, the third connector on a first end of a second outer jacket of the second streamer section, and the second streamer section having a fourth connector on a second end of the second outer jacket; and further comprising
measuring a third potential difference between the third connector of the second streamer section and the reference potential, the measuring by a second digitizer node disposed within the first steamer section.

23. The method of claim 14,
wherein creating the streamer further comprises coupling a third connector of a second streamer section directly to the second connector, the third connector on a first end of a second outer jacket of the second streamer section, and the second streamer section having a fourth connector on a second end of the second outer jacket; and
wherein measuring the first potential difference further comprises measuring between the first connector of the first streamer section and the third connector of the second streamer section.

24. The method of claim 15 further comprising communicating a data value indicative of the first potential difference between the first connector and the reference potential from the first digitizer node to a data recording system.

25. An apparatus comprising:
a first outer jacket of flexible material, the first outer jacket defines an outer surface and an interior volume of a first streamer section;
a first means for mechanically, electrically, and communicatively coupling the first streamer section directly to a mating connector of a first adjacent streamer section, the first means coupled to a first end of the first outer jacket, and a least a portion of the first means is electrically conductive for electrical contact with a water body;
a second means for mechanically, electrically, and communicatively coupling the first streamer section to a second adjacent streamer section, the second means coupled to a second end of the first outer jacket opposite the first end, and at least a portion of the second means is electrically conductive;
a first digitizer node that defines a first input port and second input port, the first digitizer node disposed within the interior volume of the first outer jacket, the first input port is electrically coupled to the first means such that the portion of the first means that is electrically-conductive is a first electrode; and
the first digitizer node configured to measure a potential difference between the first electrode at a first potential and a second potential coupled to the second input port.

26. The apparatus of claim 25 further comprising a wire disposed within the interior volume of the first outer jacket, the wire coupled to the second input port of the first digitizer node, and the wire is at least one selected from the group consisting of: electrically floated; coupled to a second electrode spaced apart from the first streamer section; and coupled to an electrode at an aft end of a streamer of which the first streamer section is a member.

27. The apparatus of claim 25 further comprising:
a second outer jacket of flexible material, the second outer jacket defines an interior volume of a second streamer section, and the second outer jacket distinct from the first outer jacket;
a third means for mechanically, electrically, and communicatively coupling the second streamer section directly to the second means, the third means coupled to a first end of the second outer jacket, and a least a portion of first means is electrically conductive;

a fourth means for mechanically, electrically, and communicatively coupling the second streamer section to an adjacent streamer section, the fourth means coupled to a second end of the second outer jacket opposite the third means, and at least a portion of the third means is electrically conductive;

a second digitizer node that defines a third input port and fourth input port, the second digitizer node disposed within the interior volume of the second outer jacket, the third input port electrically coupled to the third means such that the portion of the third means that is electrically conductive is a second electrode; and the second digitizer node configured to measure a potential difference between the second electrode at a third potential and the second potential coupled to the fourth input port.

\* \* \* \* \*